(12) United States Patent
Chiu et al.

(10) Patent No.: US 11,415,736 B2
(45) Date of Patent: Aug. 16, 2022

(54) BACKLIGHT MODULE WITH LIGHT GUIDE PLATE WITH COLUMNAR MICROSTRUCTURE GROUPS

(71) Applicant: Darwin Precisions Corporation, Hsinchu County (TW)

(72) Inventors: Yu-Huan Chiu, Hsinchu County (TW); Chien-Wei Liao, Hsinchu County (TW); Yen-Lung Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 17/354,370

(22) Filed: Jun. 22, 2021

(65) Prior Publication Data
US 2022/0187526 A1    Jun. 16, 2022

(30) Foreign Application Priority Data

Dec. 11, 2020  (TW) .................................. 109143968

(51) Int. Cl.
*F21V 8/00* (2006.01)
(52) U.S. Cl.
CPC ......... *G02B 6/0036* (2013.01); *G02B 6/0058* (2013.01); *G02B 6/0068* (2013.01)
(58) Field of Classification Search
CPC .. G02B 6/0036; G02B 6/0038; G02B 6/0061; G02B 6/0058
See application file for complete search history.

(56) References Cited

U.S. PATENT DOCUMENTS

| 8,075,174 B2* | 12/2011 | Tsai ..................... G02B 6/0038 |
| | | 362/625 |
| 8,692,464 B2 | 4/2014 | Wang et al. |
| 9,182,530 B2* | 11/2015 | Goto .................... G02B 6/0065 |
| 10,551,545 B2* | 2/2020 | Zhan ................. G02F 1/133606 |

(Continued)

FOREIGN PATENT DOCUMENTS

| TW | 200949322 A | 12/2009 |
| TW | M603119 U | 10/2020 |

*Primary Examiner* — Rajarshi Chakraborty
*Assistant Examiner* — Michael Chiang
(74) *Attorney, Agent, or Firm* — WPAT, PC

(57) ABSTRACT

The present disclosure provides a backlight module including a light guide plate including a light-emitting surface, a bottom surface opposite to the light-emitting surface, and a light-incident side connecting the light-emitting surface and the bottom surface and light-emitting elements disposed at the light-incident side along a first direction. The light guide plate includes first columnar microstructures extending along a second direction perpendicular to the first direction on the light-emitting surface and columnar microstructure groups with second columnar microstructures, which are 1-15 times the number of the adjacent first columnar microstructures, between the first columnar microstructures extending along the second direction on the light-emitting surface. A first width of the first columnar microstructures is larger than or equal to a second width of the columnar microstructure groups along the first direction. A first height of the first columnar microstructures is larger than a second height of the columnar microstructure groups.

9 Claims, 16 Drawing Sheets

(56) References Cited

U.S. PATENT DOCUMENTS

| | | | |
|---|---|---|---|
| 2007/0127268 A1 | 6/2007 | Chen | |
| 2009/0122229 A1* | 5/2009 | Kim | G02B 6/0038 349/65 |
| 2010/0046200 A1* | 2/2010 | Kuo | G02B 5/1814 359/831 |
| 2010/0128495 A1* | 5/2010 | Wang | G02B 6/0038 362/620 |
| 2013/0128609 A1* | 5/2013 | Wang | G02B 6/0038 362/606 |
| 2020/0103578 A1* | 4/2020 | Emmons | G02B 6/0065 |

* cited by examiner

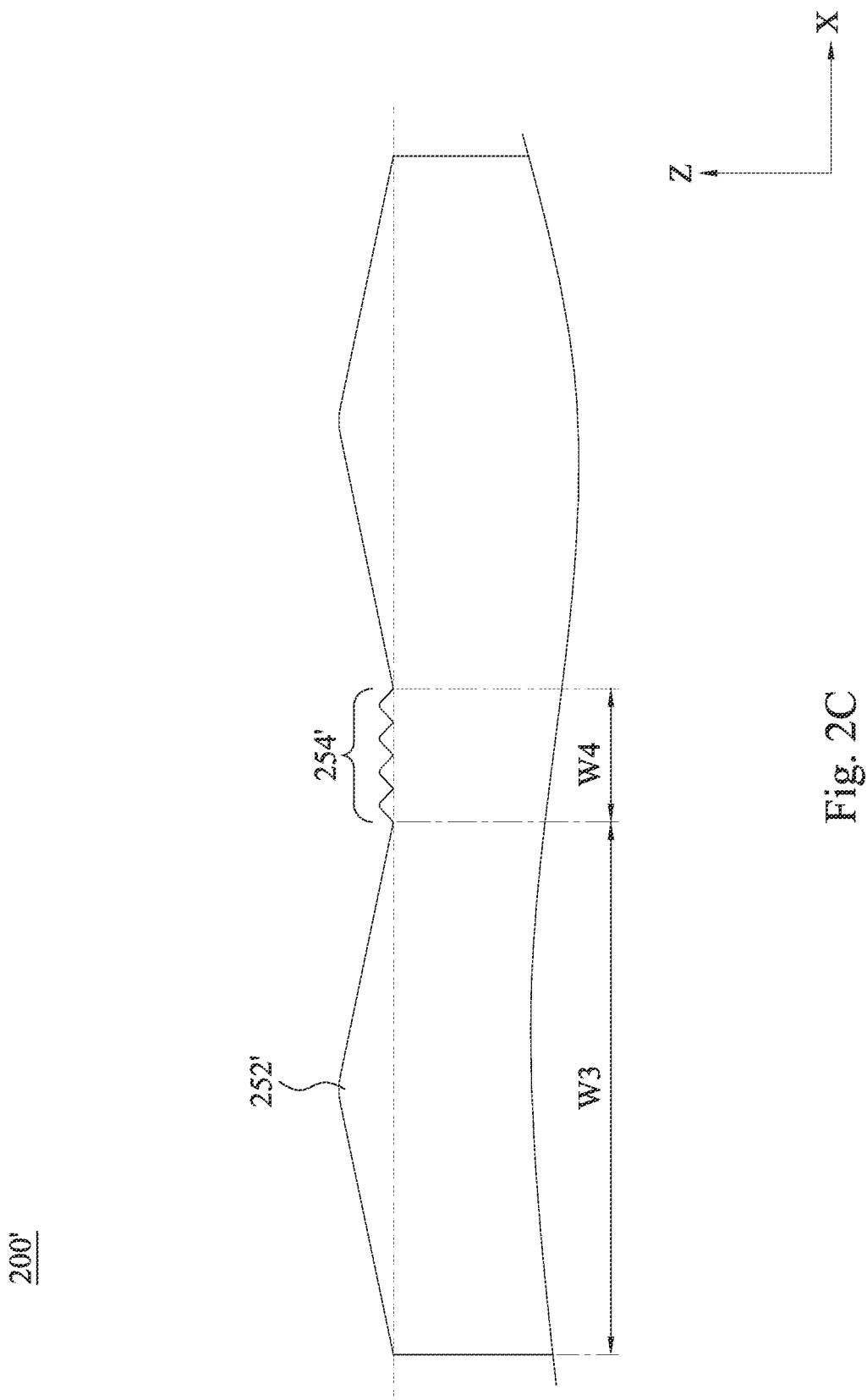

BACKLIGHT MODULE WITH LIGHT GUIDE PLATE WITH COLUMNAR MICROSTRUCTURE GROUPS

CROSS-REFERENCE TO RELATED APPLICATION

This application claims priority to Taiwan Application Serial Number 109143968, filed on Dec. 11, 2020, which is herein incorporated by reference in its entirety.

BACKGROUND

Field of Invention

The present disclosure relates to the display device. More particularly, the present disclosure relates to the backlight module of the display device.

Description of Related Art

The liquid crystal display (LCD) generally includes the liquid crystal module and the backlight module for the light source. The light provided by the light-emitting element in the backlight module is guided by the reflector, the light guide plate, the optical film layer, and other elements in the backlight module so that the backlight module may provide the light source to the entirety of the light crystal module. Therefore, the luminance uniformity of the backlight module would affect the optical performance.

SUMMARY

The present disclosure provides a backlight module including a plurality of light-emitting elements and a light guide plate, in which the light guide plate includes a light-emitting surface, a bottom surface opposite to the light-emitting surface, and a light-incident side connecting the light-emitting surface and the bottom surface, and the light-emitting elements are disposed at the light-incident side along a first direction. The light guide plate further includes a plurality of first columnar microstructures extending along a second direction perpendicular to the first direction and disposed on the light-emitting surface and a plurality of columnar microstructure groups disposed between the first columnar microstructures and on the light-emitting surface, in which each columnar microstructure group includes a plurality of second columnar microstructures extending along the second direction. The number of the second columnar microstructures of each columnar microstructure group is 1-15 times that of the adjacent one of the first columnar microstructures. Each first columnar microstructure has a first width along the first direction, each columnar microstructure group has a second width along the first direction, and the first width is larger than or equal to the second width. A first height of each first columnar microstructure is larger than a second height of each columnar microstructure group.

In the backlight module provide by the present disclosure, the adsorption between the upper surface of the light guide plate and the lower surface of the optical film layer may be reduced by the first columnar microstructure and the columnar microstructure group disposed on the upper surface of the light guide plate, which may provide improved optical performance.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows. Aspects of the present disclosure are best understood from the following detailed description when read with the accompanying figures. It is noted that, in accordance with the standard practice in the industry, various features are not drawn to scale.

FIGS. 2B-2C illustrate cross-sectional views of the light guide plate according to some embodiments of this disclosure.

DETAILED DESCRIPTION

Figure 1:
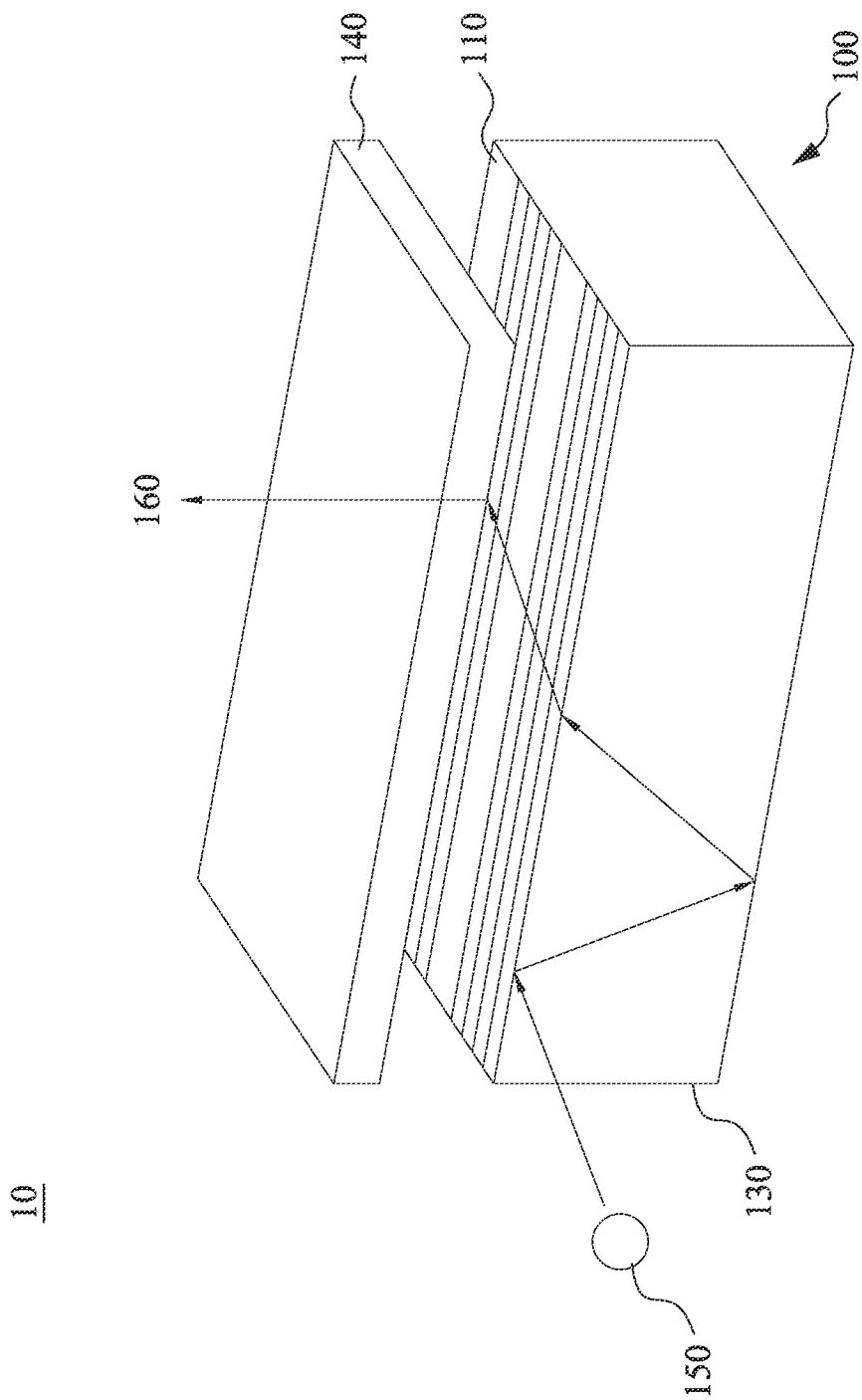
FIG. 1 illustrates a three dimensional view of a backlight module according to some embodiments of this disclosure.

The following disclosure provides many different embodiments, or examples, for implementing different features of the provided subject matter. Specific examples of components, values, arrangements, etc., are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, reference will now be made in detail to the present embodiments of the disclosure, examples of which are illustrated in the accompanying drawings. Wherever possible, the same reference numbers are used in the drawings and the description to refer to the same or like parts.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The light from the light-emitting element may be uniformed by the light guide plate and the optical film layer on the light guide plate in the backlight module to provide a surface light source of the display device. However, adsorption may happen between the upper surface of the light guide plate and the lower surface of the optical film layer. This may leads to the non-uniformity of the distance between the light guide plate and the optical film layer, which would affect the display effect. A backlight module provided by the present disclosure may eliminate the adsorption between the light guide plate and the optical film layer and improve the optical performance of the backlight module.

According to some embodiments of the present disclosure, FIG. 1 illustrates a three dimensional view of a backlight module 10. In FIG. 1, the backlight module 10 includes a light guide plate 100, an optical film layer 140 on the light guide plate 100, and a light-emitting element 150 on the side of the light guide plate 100. However, it should be understood that in the embodiments of the present disclosure, the backlight module 10 may include other materials of layers or components, and the components of the backlight module 10 may be arranged in other manners.

In some embodiments, the light-emitting element 150 may be disposed on the side of the light guide plate 100, and the side of the light guide plate 100 facing the light-emitting element 150 is referred as the light-incident side 130. In these embodiments, the backlight module 10 may also be referred as the edge type backlight module. The light 160 enters the light guide plate 100 through the light-incident side 130 and travels in the light guide plate 100 by total internal reflection. When the light 160 reaches the microstructures on the light guide plate 100, the total internal reflection of the light 160 is destructed so that the light 160 may leave the light guide plate 100 from the light-emitting surface 110. The light 160 would then pass through and be uniformed by the optical film layer 140 to enter the liquid crystal module above the backlight module 10.

Figure 2A:
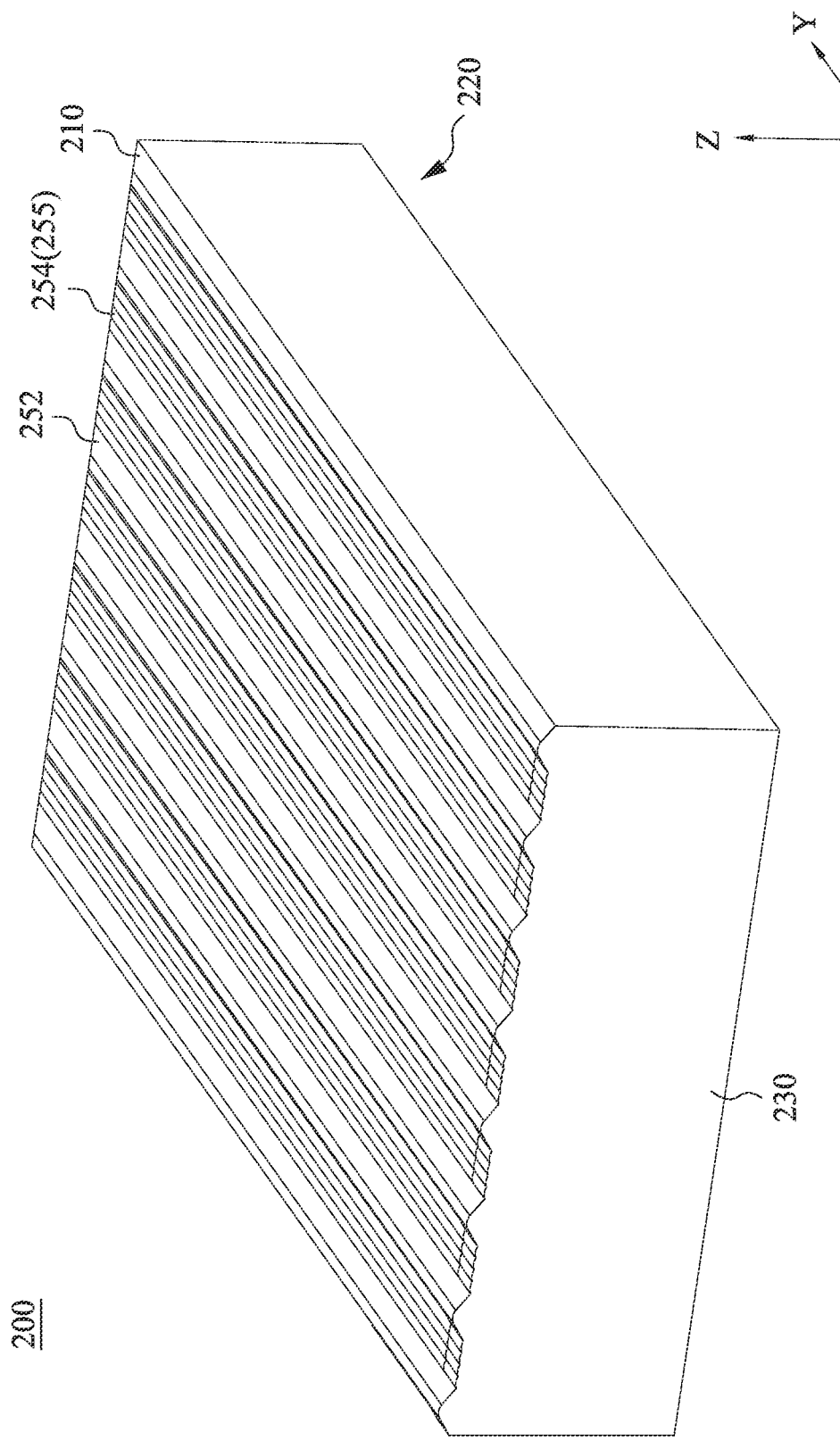
FIG. 2A illustrates a three dimensional view of a light guide plate according to some embodiments of this disclosure.
Figure 2B:
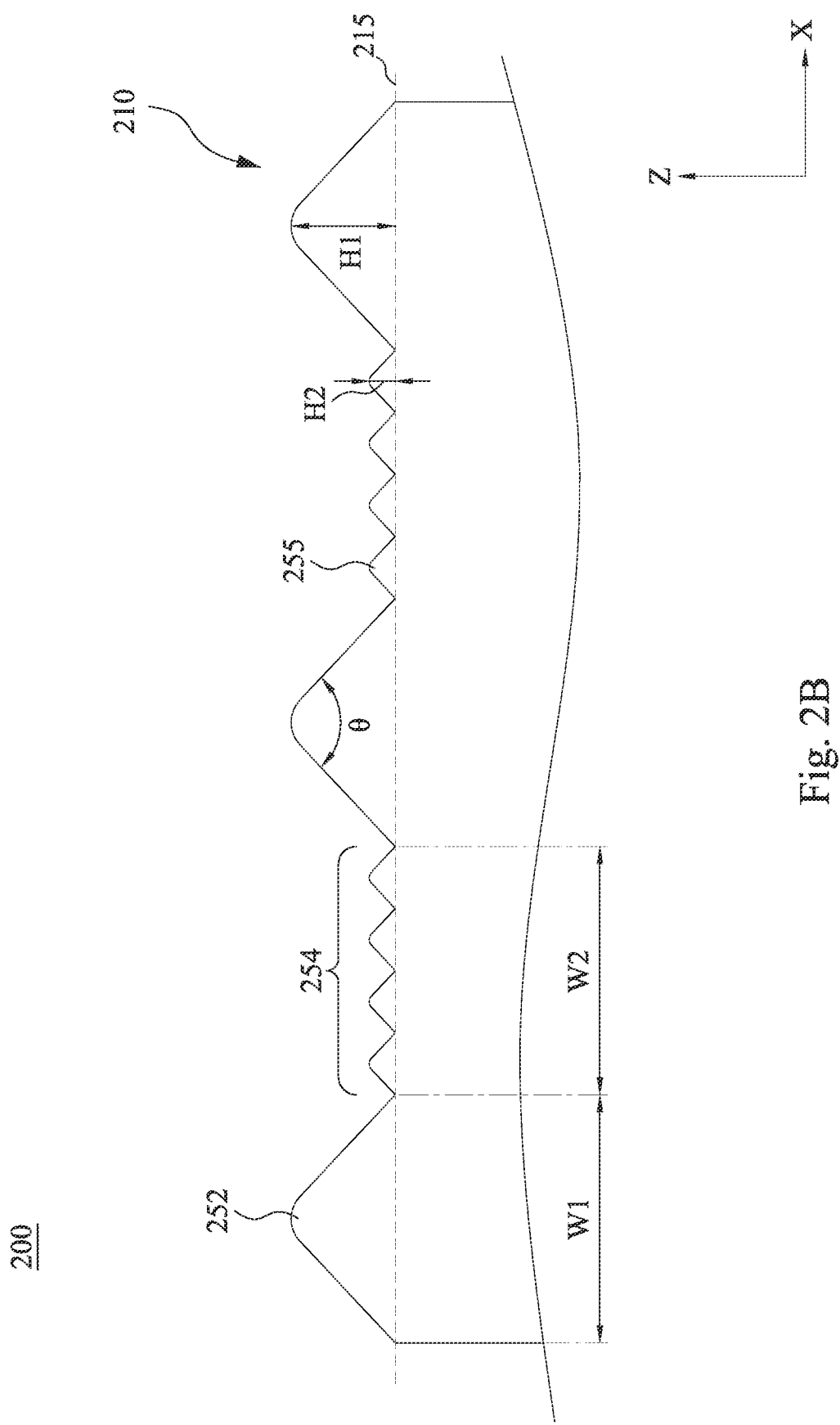

According to some embodiments of the present disclosure, FIG. 2A illustrates a three dimensional view of a light guide plate 200, and FIG. 2B illustrates a cross-sectional view of the light guide plate 200. In some embodiments, the light guide plate 200 may be the light guide plate 100 of the backlight module 10 of FIG. 1, but should not be limited to the application in the backlight module 10.

It should be noted that, in FIG. 2A and the figures referred to the following description, the first columnar microstructure 252 and the columnar microstructure group 254 on the light guide plate 200 and the corresponding microstructures on the light guide plate in the other embodiments are illustrated in enlargement to describe the relative positions or sizes of the elements. The practical sizes and positions of the elements in the present disclosure should not be limited by the figures.

As shown in FIG. 2A, the light guide plate 200 includes a light-emitting surface 210, a bottom surface 220, and a light-incident side 230. The bottom surface 220 is opposite to the light-emitting surface 210, and the light-incident side 230 connects the light-emitting surface 210 and the bottom surface 220. In some embodiments, the light-emitting elements may be disposed at the light-incident side 230 along the X axis direction so that the light may enter the light guide plate 200 through the light-incident side 230 and leave the light guide plate 200 from the light-emitting surface 210.

In FIG. 2B, the light-emitting surface 210 includes a plurality of first columnar microstructures 252 and a plurality of columnar microstructure groups 254 between the first columnar microstructures 252, and each columnar microstructure group 254 includes a plurality of second columnar microstructures 255. Although only three first columnar microstructures 252 and two columnar microstructure groups 254 are illustrated in FIG. 2B, it should be understood that the light guide plate 200 may include other numbers of the first columnar microstructures 252 and the columnar microstructure groups 254.

In some embodiments, the top end of the first columnar microstructures 252 and the second columnar microstructures 255 may have curved surfaces. The top end of the first columnar microstructure 252 has a first curved surface with a first radius of curvature, and the top end of the second columnar microstructure 255 has a second curved surface with a second radius of curvature. In some embodiments, the first radius of curvature of the first curved surface may be equal to the second radius of curvature of the second curved surface. In some embodiments, the first radius of curvature may be in a range of 0.005 mm to 0.2 mm. In some embodiments, an angle θ between the two side surfaces of the first columnar microstructure 252 may be in a range of 30° to 150°.

As shown in FIG. 2B, the first columnar microstructures 252 and the columnar microstructure groups 254 are arranged alternatively on the light-emitting surface 210. In other words, a plurality of second columnar microstructures 255 are disposed between the first columnar microstructures 252. In some embodiments, the number of the second columnar microstructures 255 in each columnar microstructure group 254 may be in a range of 1-15 so that the number of the second columnar microstructures 255 of each columnar microstructure group 254 is 1-15 times that of the adjacent first columnar microstructure 252. For example, single second columnar microstructure 255 may be disposed between the first columnar microstructures 252, which the first columnar microstructure 252 and the second columnar microstructure 255 are arranged alternatively. For another example, two to ten second columnar microstructures 255 may be disposed between the first columnar microstructures 252.

In FIG. 2B, the first columnar microstructure 252 has a first width W1 along the X axis direction, and the columnar microstructure group 254 has a second width W2 along the X axis direction. In some embodiments, the sum of the first width W1 and the second width W2 may be in a range of 0.03 mm to 0.8 mm.

In some embodiments, the first width W1 may be larger than and equal to the second width W2. According to some embodiments, FIG. 2C illustrates a cross-sectional view of a light guide plate 200'. The light guide plate 200' is similar to the light guide plate 200 in FIG. 2B, in which the first columnar microstructure 252' has a first width W3 along the X axis direction, the columnar microstructure group 254' has a second width W4 along the X axis direction, and the first width W3 is larger than the second width W4.

In FIG. 2B, the top end of the first columnar microstructure 252 to a reference line 215 along the Z axis direction may have a first height H1, the top end of the second columnar microstructure 255 in the columnar microstructure group 254 to the reference line 215 along the Z axis direction may have a second height H2, and the reference line 215 extends along the X axis direction and connects the valley lines between the first columnar microstructure 252 and the second columnar microstructure 255. In some embodiments, the first height H1 may be larger than the second height H2. In some embodiments, the difference between the first height H1 and the second height H2 may be in a range of 0.008 mm to 0.1 mm. In some embodiments, the first height H1 may be in a range of 0.01 mm to 0.2 mm.

As the first height H1 of the first columnar microstructure 252 is larger than the second height H2 of the second columnar microstructure 255, the first columnar microstructure 252 of the light guide plate 200 in the backlight module 10 in FIG. 1 contacts the optical film layer 140, and the columnar microstructure group 254 is separated from the optical film layer 140. Therefore, the adsorption may be eliminated between the light-emitting surface 210 and the optical film layer 140 of the light guide plate 200.

The first columnar microstructure 252 and the second columnar microstructure 255 extend along the Y axis direction on the light-emitting surface 210. In some embodiments, the first columnar microstructure 252 and the second columnar microstructure 255 may have the same shape. In some embodiments, the first columnar microstructure 252 and the second columnar microstructure 255 may have the shape different from the triangular microstructure with the round angle shown in FIG. 2B, which would be further discussed in detail in the following description.

According to some embodiments of the present disclosure, FIGS. 3A-3D illustrates a light guide plate 300, a light guide plate 310, a light guide plate 320, and a light guide plate 330, respectively. As shown in FIGS. 3A-3D, the light guide plate 300, the light guide plate 310, the light guide plate 320, and the light guide plate 330 include different shapes of the first columnar microstructure and the second columnar microstructure. In some embodiments, the first columnar microstructure and the second columnar microstructure may have the same shape.

Figure 3A:
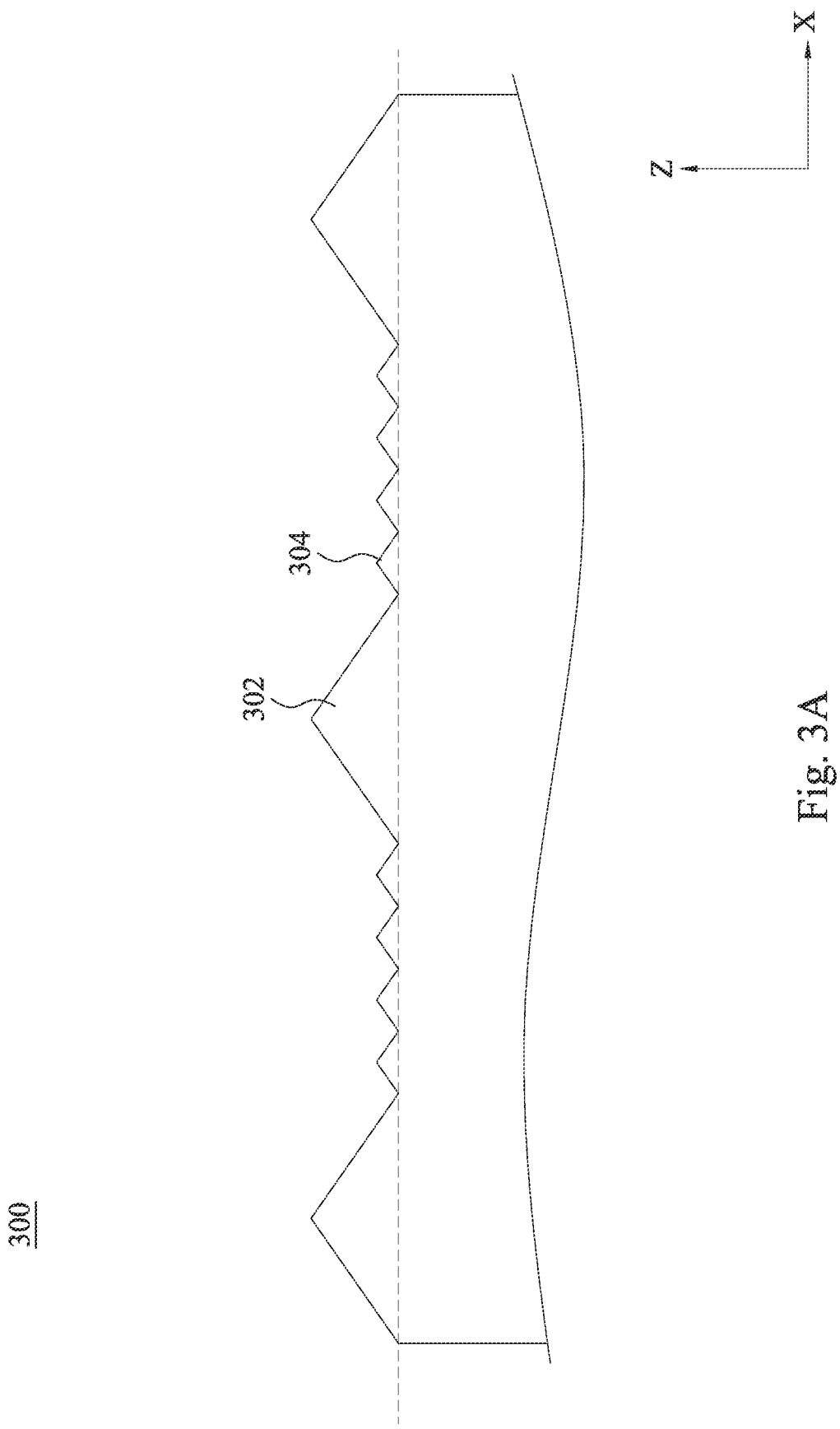
FIGS. 3A-3D illustrate cross-sectional views of the light guide plates according to some embodiments of this disclosure.
Figure 3B:
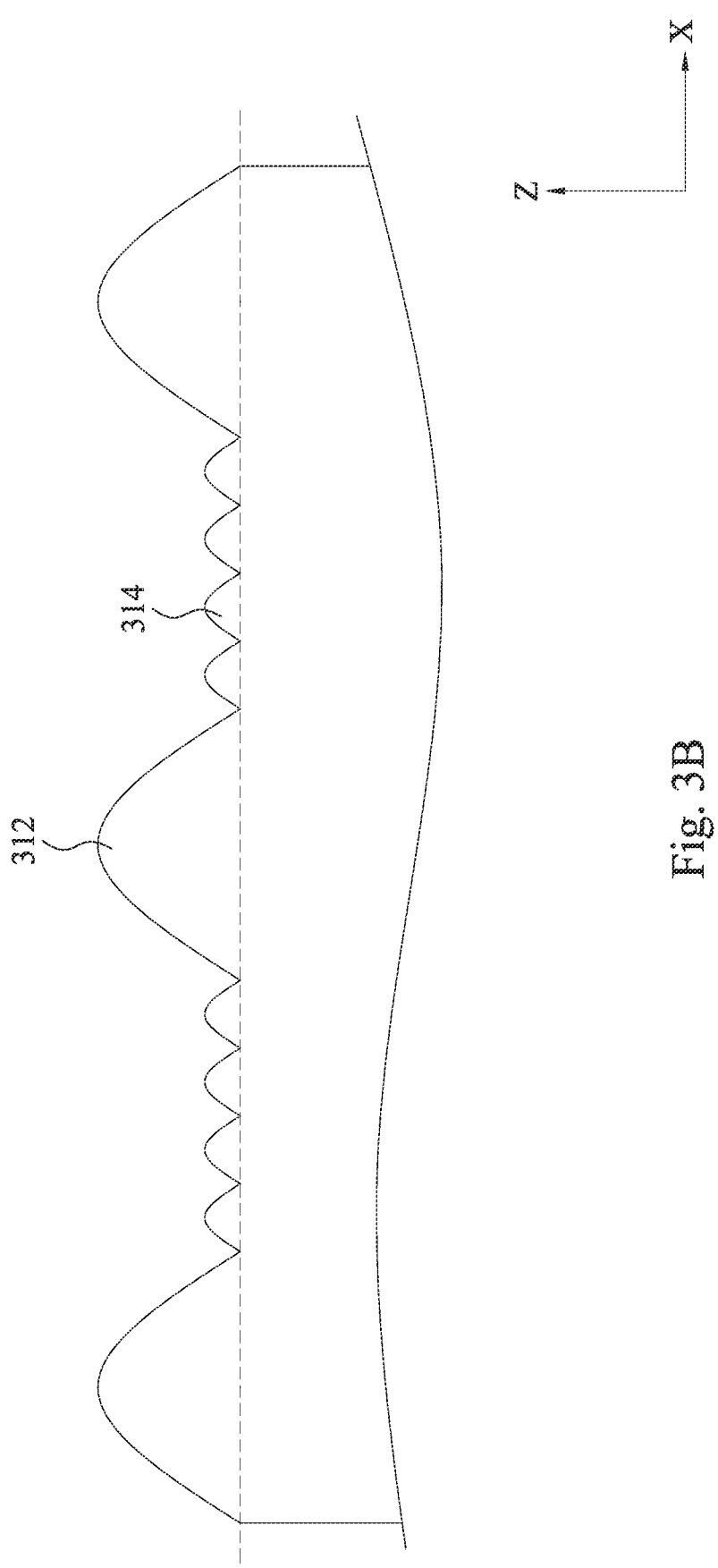
Figure 3C:
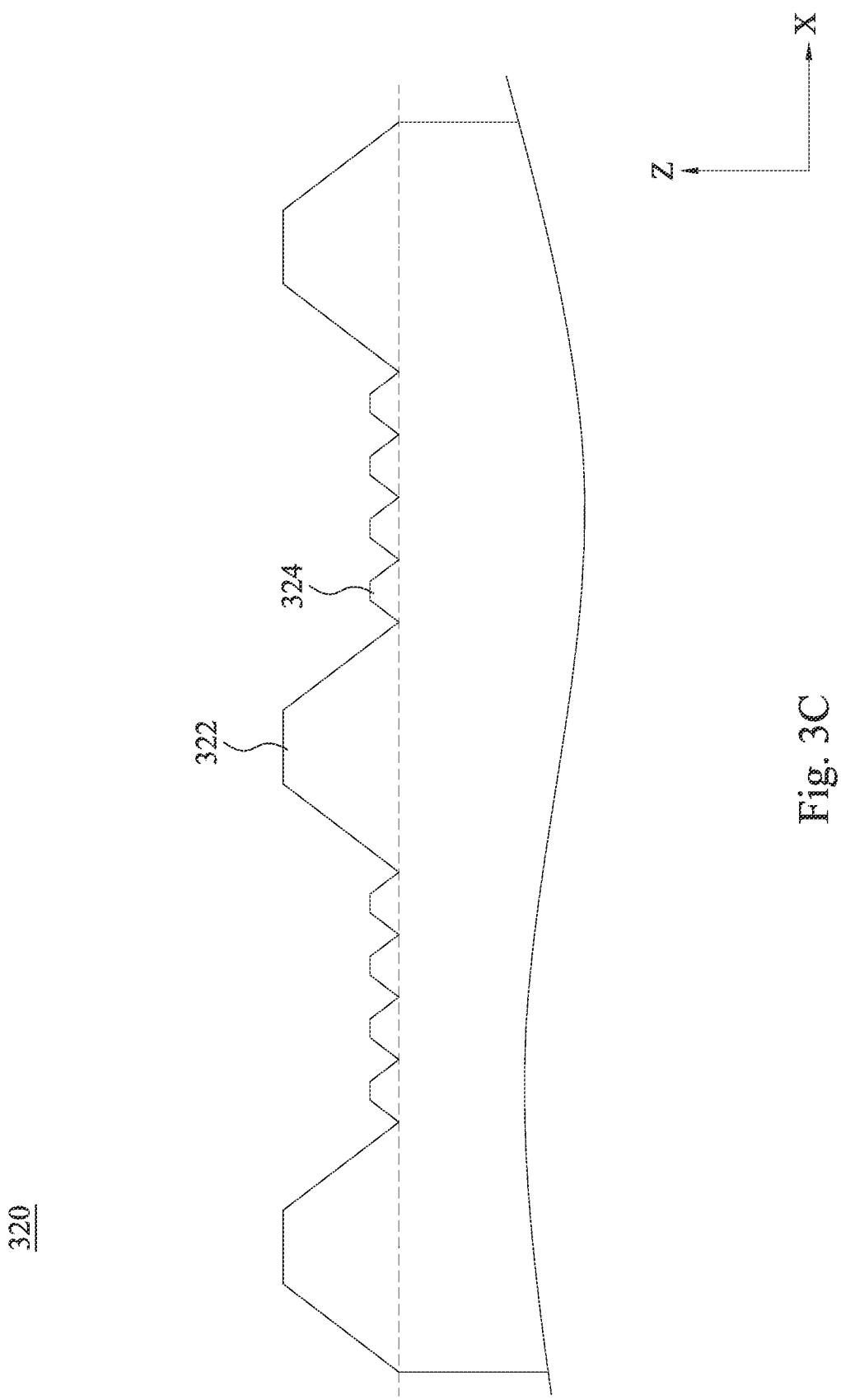
Figure 3D:
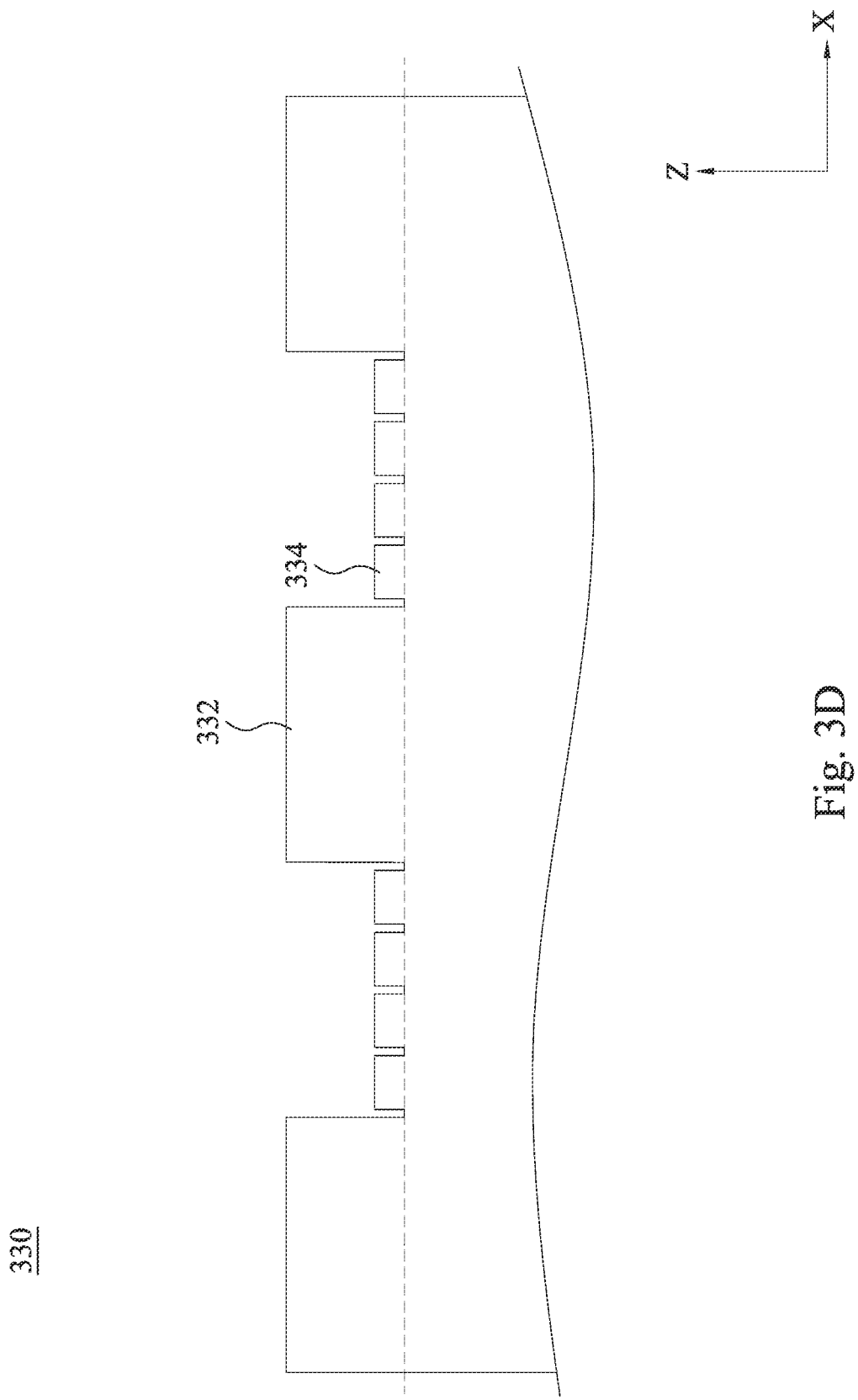

In FIG. 3A, the light guide plate 300 includes the triangular first columnar microstructures 302 and second columnar microstructures 304 made by V-cut. In FIG. 3B, the light guide plate 310 includes the bullet-shaped first columnar microstructures 312 and second columnar microstructures 314 made by curved-cut. In FIG. 3C, the light guide plate 320 includes the trapezoid first columnar microstructures 322 and second columnar microstructures 324. In FIG. 3D, the light guide plate 330 includes the rectangular first columnar microstructures 332 and second columnar microstructures 334. FIGS. 3A-3D only exemplarily illustrate the shapes of the microstructures on the light guide plate, and other shapes of the microstructures are fully intended to be included within the scope of the present disclosure.

Figure 4A:
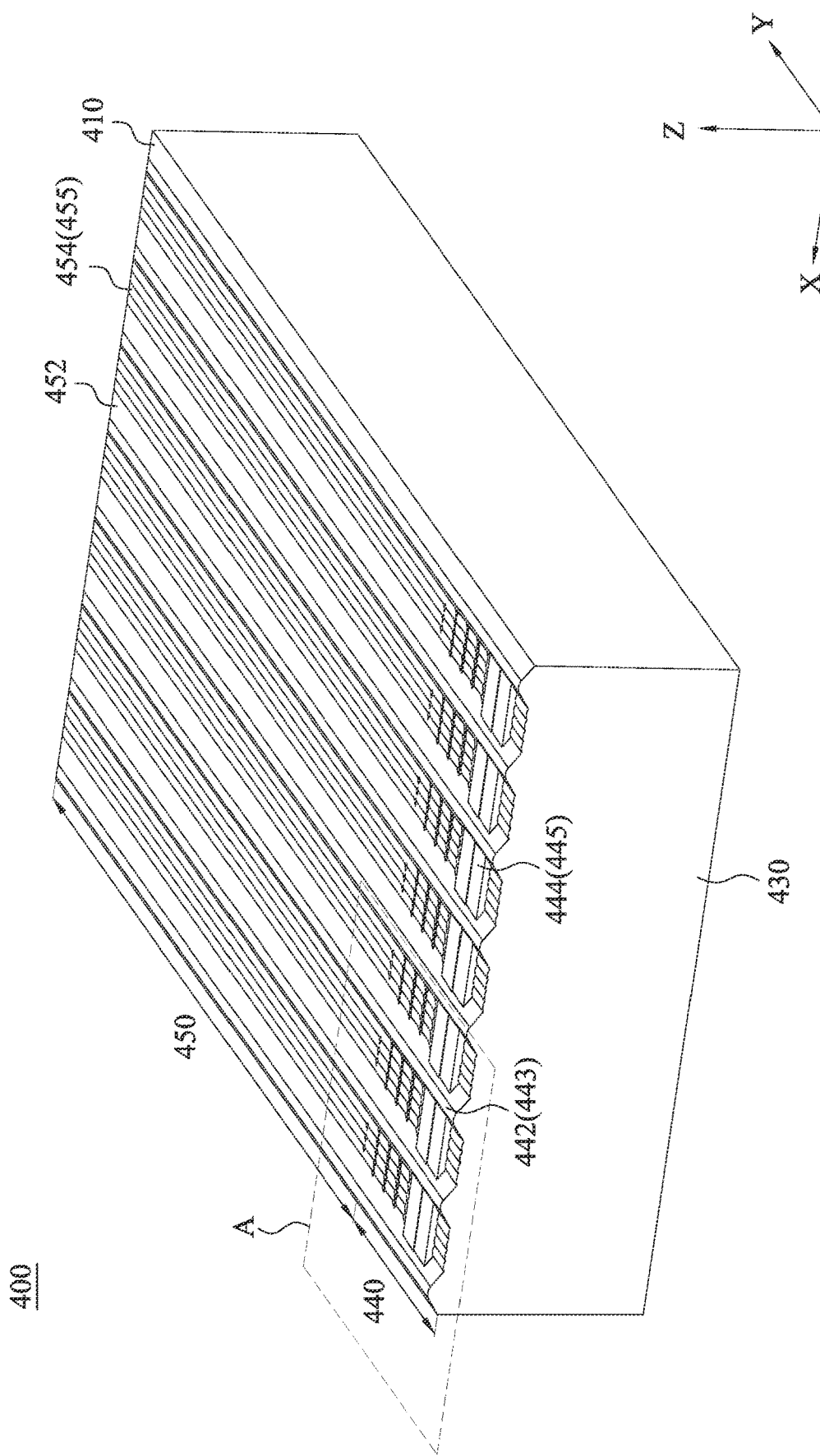
FIG. 4A illustrates a three dimensional view of a light guide plate according to some embodiments of this disclosure.
Figure 4B:
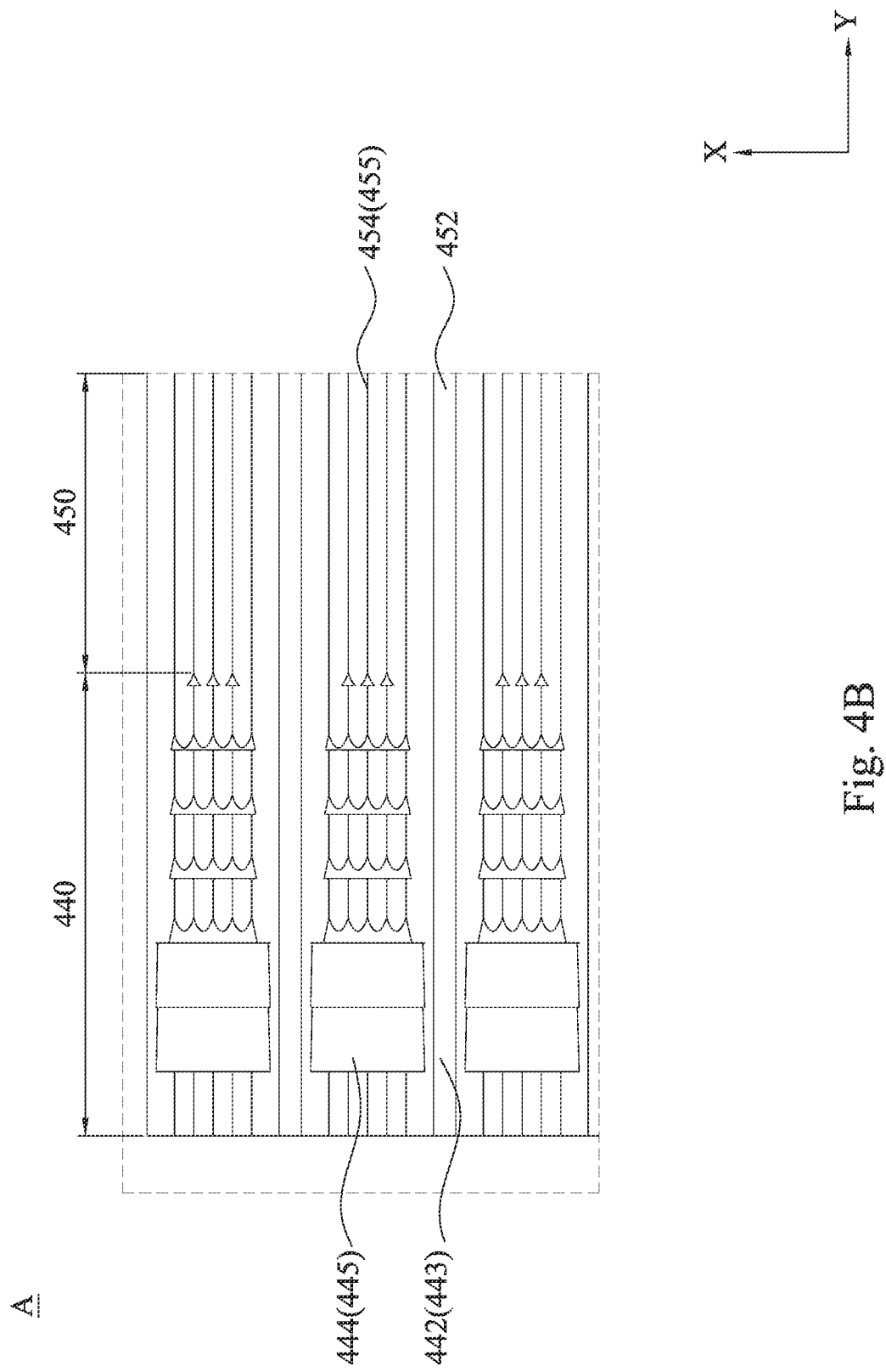
FIG. 4B illustrates an enlarged top view of an area of the light guide plate in FIG. 4A.

According to some embodiments of the present disclosure, FIG. 4A illustrates a three dimensional view of a light guide plate 400. FIG. 4B illustrates an enlarged top view of an area A of the light guide plate 400 in FIG. 4A. In some embodiments, the light-emitting surface 410 of the light guide plate 400 may include a first region 440 and a second region 450, the first region 440 and the second region 450 are arranged along the Y axis direction, and the first region 440 is closer to the light-incident side 430 than the second region 450. In some embodiments, the ratio of the width of the second region 450 to the width of the light-emitting surface 410 along the Y axis direction may be in a range of 90% to 99%.

In FIGS. 4A and 4B, the first region 440 includes a plurality of first microstructure groups 442 and a plurality of second microstructure groups 444. In some embodiments, the first microstructure group 442 may include a plurality of first microstructures 443 arranged along the Y axis direction, and the second microstructure group 444 may include a plurality of second microstructures 445 arranged along the Y axis direction. In some embodiments, the first microstructure group 442 and the second microstructure group 444 may include the structures different from the first columnar microstructure 452 and the columnar microstructure group 454. For example, the second microstructure group 444 may include the prismatic structures arranged along the Y axis direction, and the first microstructure group 442 may include the columnar structures between the prismatic structures.

The second region 450 may include a plurality of first columnar microstructures 452 and a plurality of columnar microstructure groups 454 between the first columnar microstructures 452, and each columnar microstructure group 454 may include a plurality of second columnar microstructures 455. The first columnar microstructures 452 and the columnar microstructure groups 454 may be similar to the first columnar microstructures 252 and the columnar microstructure groups 254 in FIG. 2B, thus details are not repeated.

In some embodiments, each first microstructure group 442 and the corresponding first columnar microstructure 452 may be arranged along the Y axis direction, and each second microstructure group 444 and the corresponding columnar microstructure group 454 may be arranged along the Y axis direction. In some embodiments, the first microstructure group 442 and the second microstructure group 444 may be disposed in the first region 440 and free from being disposed in the second region 450. In some embodiments, the first columnar microstructure 452 and the columnar microstructure group 454 of the second region 450 may not be adjacent to the light-incident side 430 because the first region 440 is closer to the light-incident side 430 than the second region 450.

Figure 5:
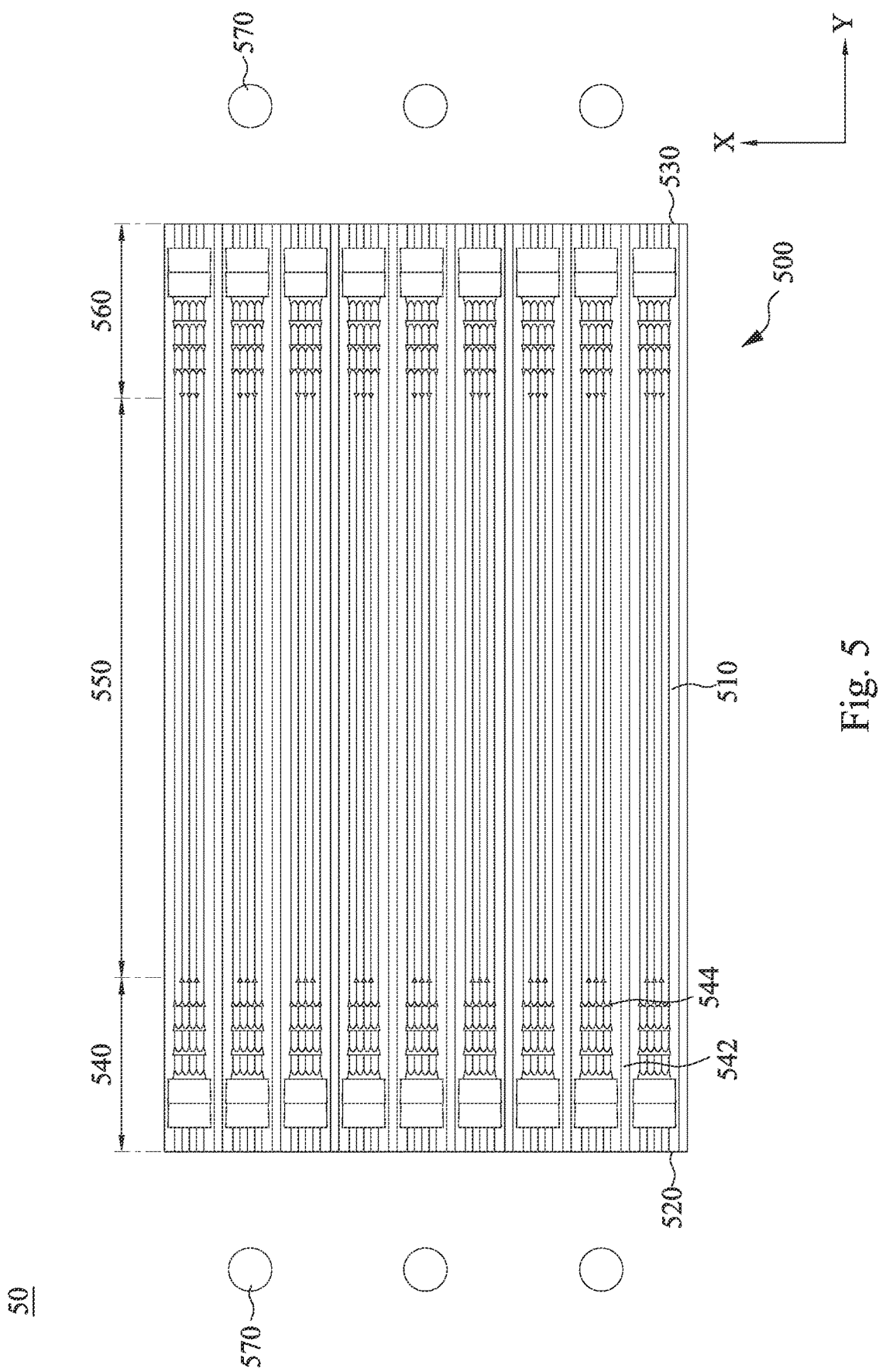
FIG. 5 illustrates a top view of a backlight module according to some embodiments of this disclosure.

According to some embodiments of the present disclosure, FIG. 5 illustrates a three dimensional view of a backlight module 50. The backlight module 50 is similar to the backlight module 10 in FIG. 1 but only the light guide plate 500 and the light-emitting element 570 of the backlight module 50 are illustrated for detailed description. However, it should be understood that the backlight module 50 may include other materials of layers or components, such as the optical film layer 140 in the FIG. 1.

In the backlight module 50, the light guide plate 500 includes a light-emitting surface 510, a first light-incident side 520 at the side of the light guide plate 500, and a second light-incident side 530 opposite to the first light-incident side 520. The first light-incident side 520 and the second light-incident side 530 collectively connect the light-emitting surface 510 and the bottom surface of the light guide plate 500. The backlight module 50 also includes a plurality of light-emitting elements 570, and the light-emitting elements 570 are disposed at the first light-incident side 520 and the second light-incident side 530 along the X axis direction.

In some embodiments, the light-emitting surface 510 may include a first region 540, a second region 550, and a third region 560, in which the first region 540, the second region 550, and the third region 560 are arranged along the Y axis direction. The first region 540 is adjacent to the first light-incident side 520, the third region 560 is adjacent to the second light-incident side 530, and the second region 550 is disposed between the first region 540 and the third region 560.

The first region 540 and the third region 560 are similar to the first region 440 in FIGS. 4A and 4B. In other words, the first region 540 and the third region 560 include a plurality of first microstructure groups 542 and second microstructure groups 544 similar to the first microstructure groups 442 and the second microstructure groups 444. In other embodiments, the first region 540 and the third region 560 may include the first microstructure groups 542 and the second microstructure groups 544 different from the first columnar microstructures 452 and the columnar microstructure groups 454 in FIGS. 4A and 4B.

The second region 550 is similar to the second region 450 in FIGS. 4A and 4B. In other words, the second region 550 includes the first columnar microstructures and the columnar microstructure groups along the Y axis direction similar to those in FIGS. 4A and 4B, such as the first columnar microstructures 452 and the columnar microstructure groups 454. Therefore, those details are not repeated here. In some embodiments, the first columnar microstructures and the columnar microstructure groups may be disposed in the second region 550, and the first microstructure group 542 and the second microstructure group 544 are disposed in the first region 540 and the third region 560 and free from being disposed in the second region 550. In other words, the first columnar microstructures and the columnar microstructure groups may not be adjacent to the first light-incident side 520 or the second light-incident side 530.

According to some embodiments of the present disclosure, FIGS. 6A-6E illustrate cross-sectional views of forming a light guide plate 606 at fabrication stages. It should be understood, other processes may be included before, during, and after the processes illustrated in FIGS. 6A-6E, and the numbers of the components in FIGS. 6A-6E are exemplary. Other numbers of the processes and the components may be included in other embodiments. For example, the light guide plate 606 in FIG. 6E includes a first region and a second region similar to the first region 440 and the second region 450 of the light guide plate 400, but the light guide plate 606 in other embodiments may include a third region similar to the third region 560 of the light guide plate 500.

Figure 6A:
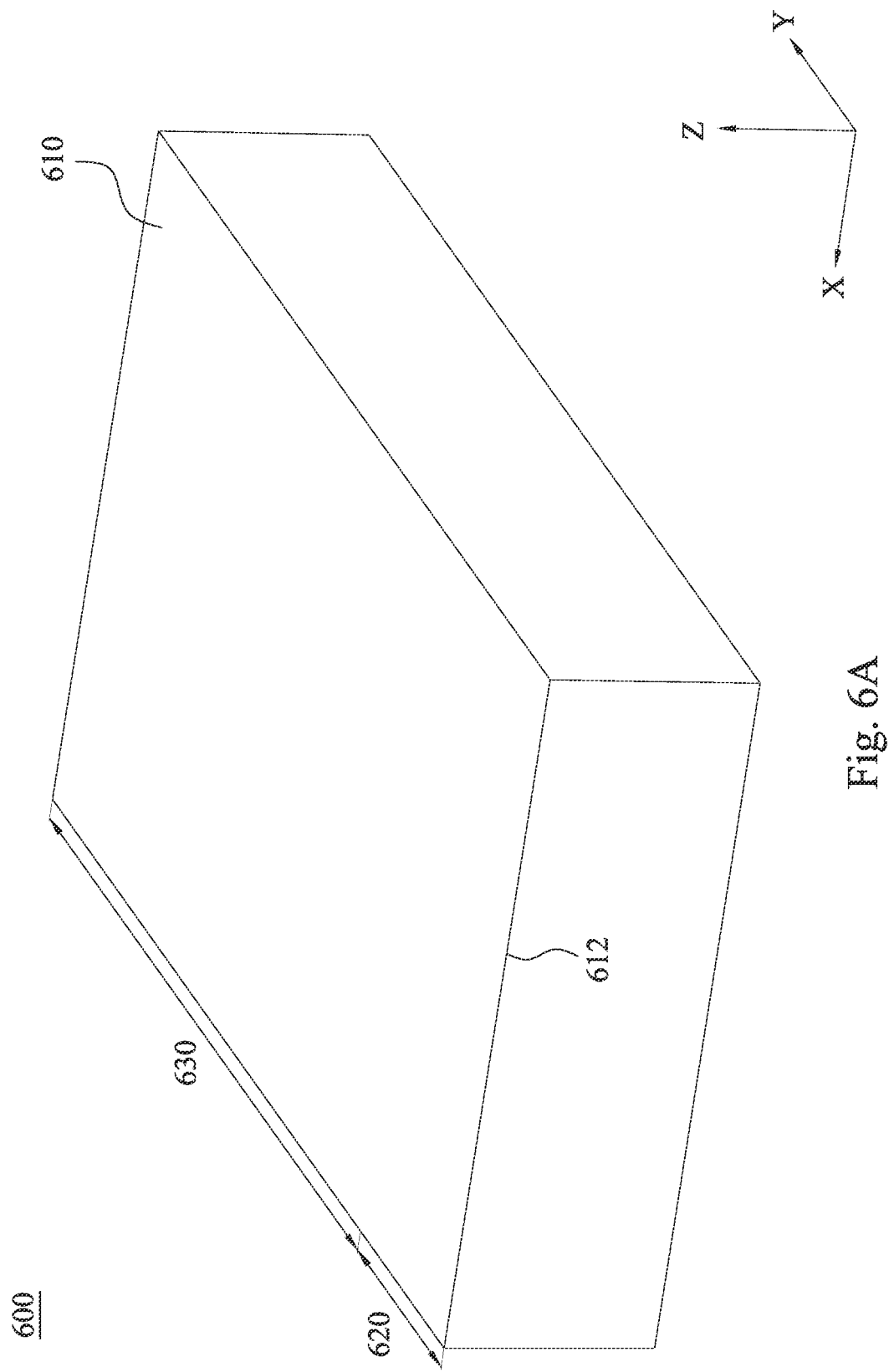
FIGS. 6A-6E illustrate cross-sectional views of forming the light guide plate at fabrication stages according to some embodiments of this disclosure.
Figure 6B:
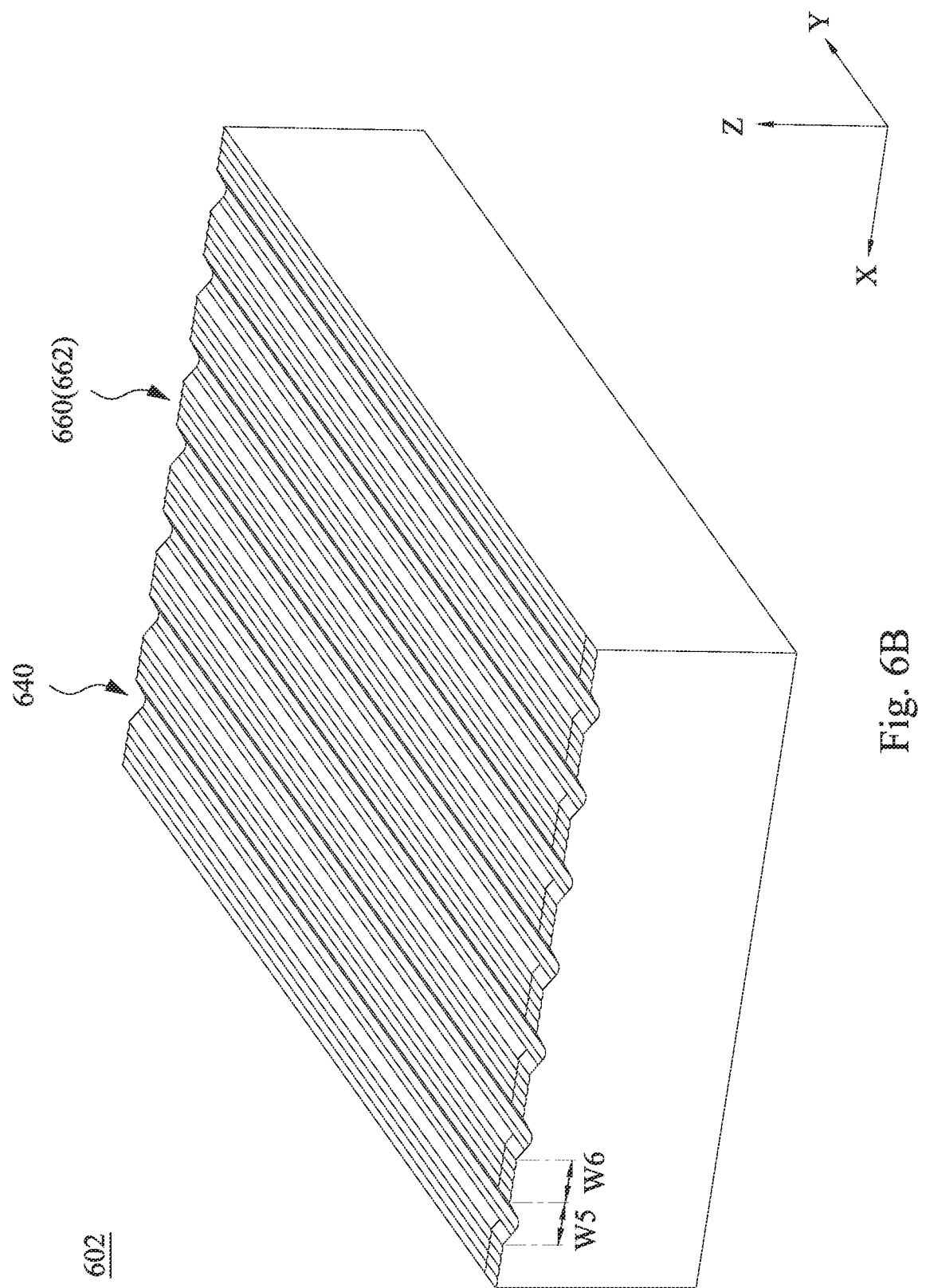
Figure 6C:
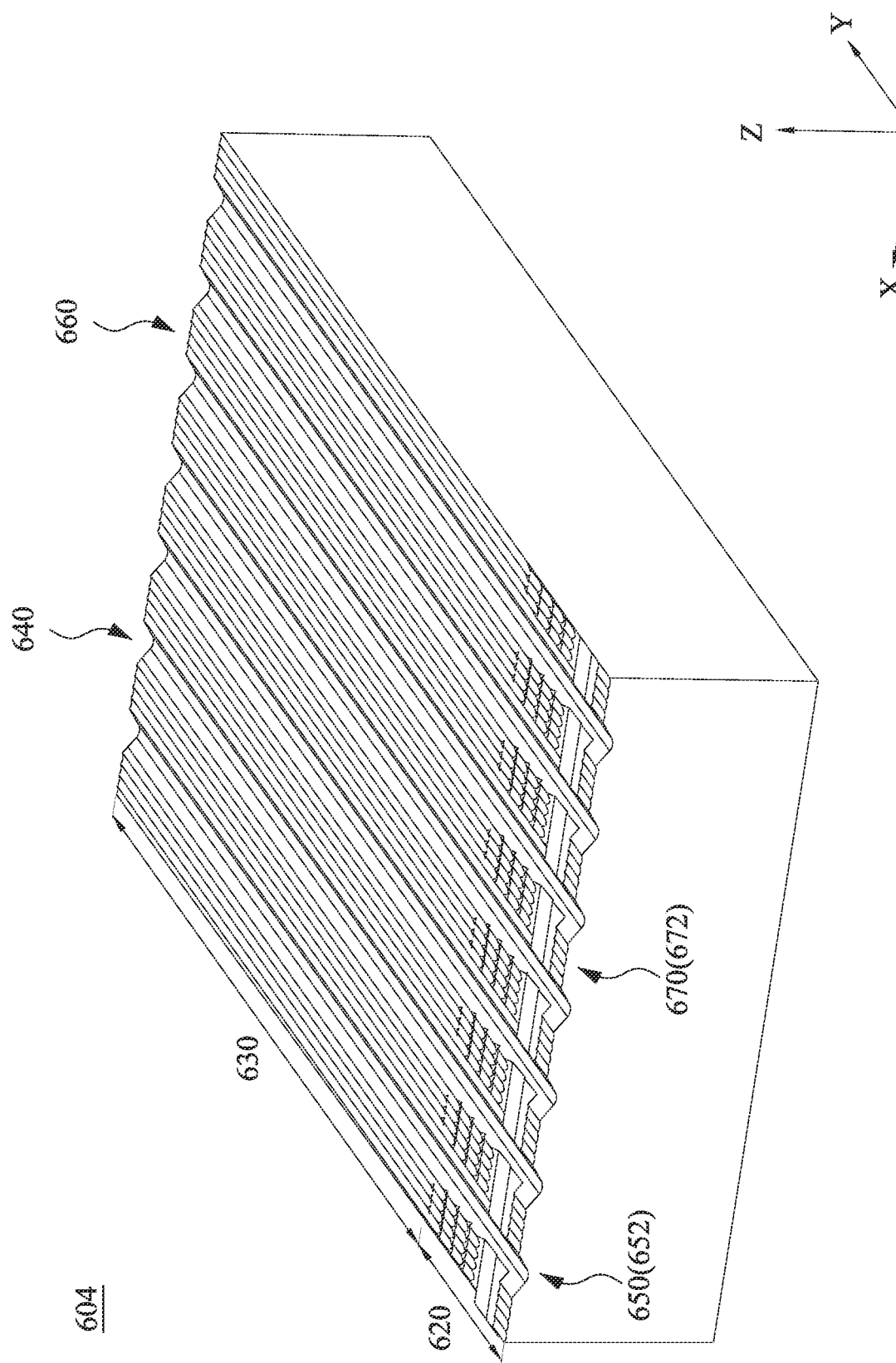
Figure 6D:
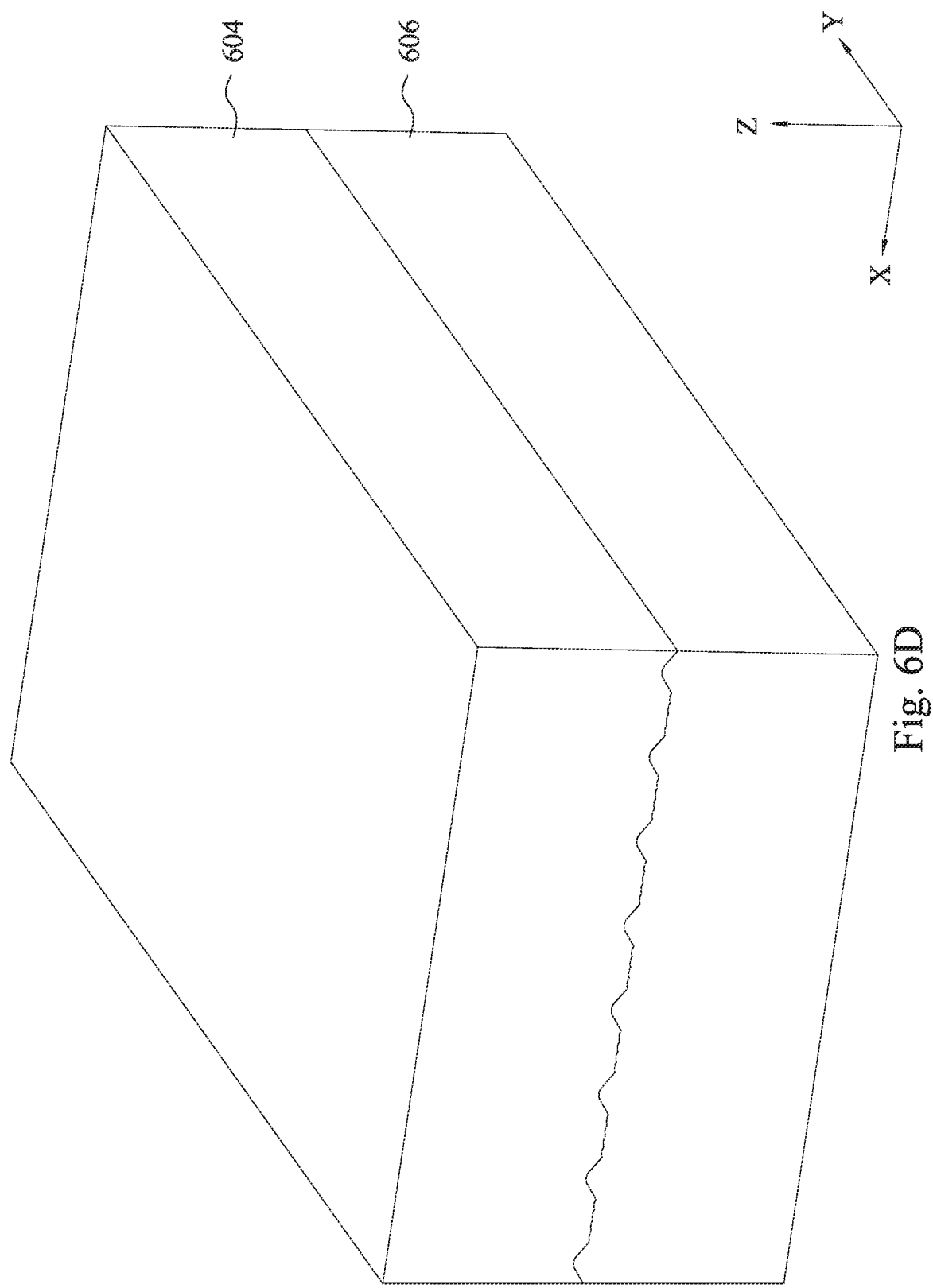
Figure 6E:
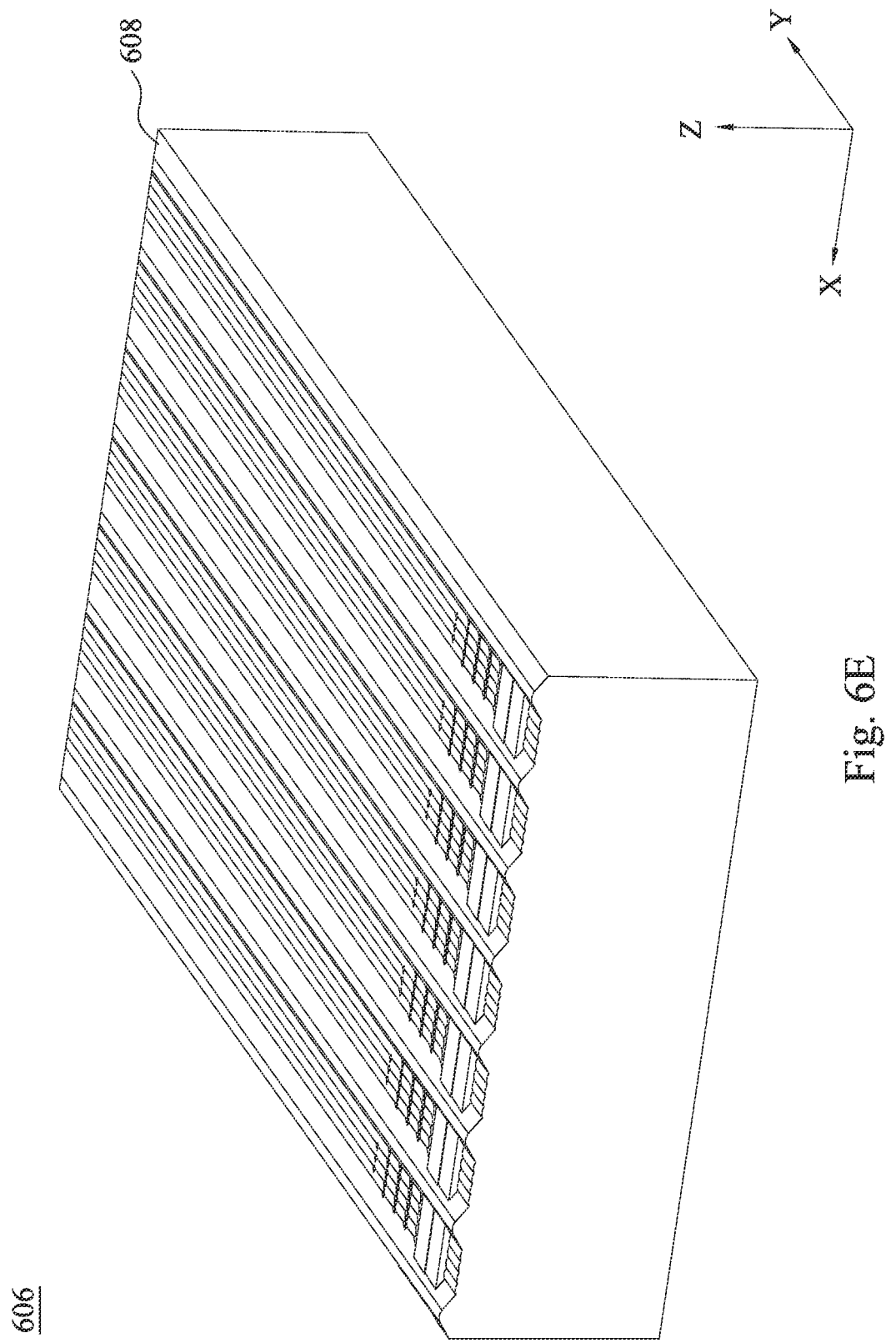

In FIG. 6A, a substrate 600 is provided as a substrate for the following processing fabrication to form the mold for the light guide plate 606 (as shown in FIG. 6E). The substrate 600 includes a processing plane 610 which may be formed into the later described structures by the processing tools in the following processes, for example, formed by the processing cutter.

In some embodiments, the processing plane 610 may include a first processing region 620 and a second processing region 630, in which the first processing region 620 and the second processing region 630 may be arranged along the Y axis direction, and the first processing region 620 may be closer to the first edge 612 of the processing plane 610 than the second processing region 630. In some embodiments, the ratio of the width of the second processing region 630 to the width of the processing plane 610 along the Y axis direction may be in a range of 90% to 99%.

In FIG. 6B, the substrate 602 is formed. A plurality of first mold trenches 640 extending along the Y axis direction are formed on the processing plane 610 of the substrate 600 in FIG. 6A by the processing cutter with a profile similar to the above mentioned first columnar microstructure 452, in which interval regions are included between the first mold trenches 640. Next, a mold trench group 660 is formed in each interval region by the processing cutter with a profile similar to the above mentioned second columnar microstructure 455, in which a plurality of second mold trenches 662 extending along the Y axis direction are included in the mold trench group 660.

As shown in FIG. 6B, the first mold trenches 640 and the mold trench groups 660 are arranged alternatively. In other words, a plurality of second mold trenches 662 are disposed between the first mold trenches 640. In some embodiments, the number of the second mold trenches 662 in each mold trench group 660 may be in a range of 1-15 so that the number of the second mold trenches 662 in each mold trench group 660 is 1-15 times that of the first mold trenches 640. For example, each mold trench group 660 may include toe to ten second mold trenches 662.

In some embodiments, the first mold trench 640 corresponds to the first columnar microstructure 452 of the light guide plate 400 in FIGS. 4A and 4B, and the mold trench group 660 corresponds to the columnar microstructure group 454 of the light guide plate 400 in FIGS. 4A and 4B. For example, the first mold trench 640 may have a first width W5 along the X axis direction, the mold trench group 660 may have a second width W6 along the X axis direction, and the first width W5 is larger or equal to the second width W6. In some embodiments, the sum of the first width W5 and the second width W6 may be in a range of 0.03 mm to 0.8 mm.

In some embodiments, the bottom portions of the first mold trench 640 and the second mold trench 662 may have curved surfaces, and the bottom curved surfaces of the first mold trench 640 and the second mold trench 662 may have the same radius of curvature. In some embodiments, the radius of curvature of bottom curved surface of the first mold trench 640 may be in a range of 0.005 mm to 0.2 mm.

In some embodiments, the first mold trench 640 may have a first depth (not shown), the second mold trench 662 may have a second depth (not shown), and the first depth is larger than the second depth. In some embodiments, the difference between the first depth and the second depth may be in a range of 0.008 mm to 0.1 mm. In some embodiments, the first depth may be in a range of 0.01 mm to 0.2 mm.

In some embodiments, the process forming the light guide plate 606 may include forming the substrate 604. A plurality of first discontinuous structure groups 650 and second discontinuous structure groups 670 are formed on the processing plane of the substrate 602 in FIG. 6B. The size and the shape of the first discontinuous structure groups 650 correspond to those of the first microstructure group 442 in FIGS. 4A and 4B, and the size and the shape of the second discontinuous structure groups 670 correspond to those of the second microstructure group 444 in FIGS. 4A and 4B.

In some embodiments, the first discontinuous structure group 650 may be formed in the first processing region 620 and free from being formed in the second processing region 630. In some embodiments, a plurality of first discontinuous structure groups 650 may be formed in the first processing region 620, in which each first discontinuous structure group 650 and the corresponding first mold trench 640 are arranged along the Y axis direction. In some embodiments, the first discontinuous structure group 650 may include a plurality of first mold cavities 652 arranged along the Y axis direction.

In some embodiments, the second discontinuous structure group 670 may be formed in the first processing region 620 and free from being formed in the second processing region 630. In some embodiments, a plurality of second discontinuous structure groups 670 may be formed in the first processing region 620, in which each second discontinuous structure group 670 and the corresponding mold trench group 660 are arranged along the Y axis direction. In some embodiments, the second discontinuous structure group 670 may include a plurality of second mold cavities 672 along the Y axis direction.

In some embodiments, the first processing region 620, the second processing region 630, and the third processing region (not shown) may be arranged sequentially along the Y axis direction on the processing plane 610 of the substrate 600. The first processing region 620 is adjacent to a first edge 612, and the third processing region is adjacent to a second edge (not shown) opposite to the first edge 612. The third processing region is similar to the first processing region 620, and the first discontinuous structure group 650 and the second discontinuous structure group 670 is formed in the third processing region.

In FIG. 6D-6E, the processed substrate 604 is used as the mold to form a light-emitting surface 608 of the light guide plate 606 by rolling over with the processing plane. The light-emitting surface 608 of the light guide plate 606 includes the structures formed from the first mold trench 640 and the mold trench group 660, for example, the first columnar microstructure 452 and the columnar microstructure group 454 in the FIGS. 4A and 4B. The structure formed from the mold trench group 660 is separated from the optical film layer later formed on the light guide plate 606 because of the different heights of the structures formed from the first mold trench 640 and the mold trench group 660, which eliminates the adsorption between the light guide plate 606 and the optical film layer.

In the backlight module disclosed in the present disclosure, the light guide plate has an upper surface structure including the first columnar microstructures and the columnar microstructure groups with the second columnar microstructures, which may adjust partial light-emitting luminance and angle. As the sizes of the first columnar microstructures and the second columnar microstructures are different, the adsorption between the light guide plate and the optical film layer above the light guide plate may be prevented. The light guide plate disclosed in the present disclosure may further include microstructure groups disposed in the region different from that of the columnar microstructures, which may further uniform the light leaving the backlight module.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module, comprising:
    a plurality of first light-emitting elements; and
    a light guide plate, comprising:
        a light-emitting surface;
        a bottom surface opposite to the light-emitting surface;
        a first light-incident side connecting the light-emitting surface and the bottom surface, and the first light-emitting elements are disposed at the first light-incident side along a first direction;
        a plurality of first columnar microstructures extending along a second direction perpendicular to the first direction and disposed on the light-emitting surface;
        a plurality of columnar microstructure groups disposed between the first columnar microstructures on the light-emitting surface, each columnar microstructure group comprises a plurality of second columnar microstructures extending along the second direction,
        wherein a number of the second columnar microstructures of each columnar microstructure group is 1-15 times a number of the adjacent one of the first columnar microstructures,
        wherein each first columnar microstructure has a first width along the first direction, each columnar microstructure group has a second width along the first direction, the first width is larger than or equal to the second width,
        wherein a first height of each first columnar microstructure is larger than a second height of each columnar microstructure group;
    a plurality of first microstructure groups, comprising a plurality of first microstructures arranged along the second direction; and
    a plurality of second microstructure groups, comprising a plurality of second microstructures arranged along the second direction,
    wherein the light-emitting surface comprises a first region adjacent to the first light-incident side and a second region arranged with the first region along the second direction on the light-emitting surface, the first microstructure groups and the second microstructure groups are disposed in the first region and free from being disposed in the second region, each first microstructure group and one of the first columnar microstructures are arranged along the second direction, and each second microstructure group and one of the columnar microstructure groups are arranged along the second direction.

2. The backlight module of claim 1, wherein the first columnar microstructures and the columnar microstructure groups are disposed in the second region.

3. The backlight module of claim 1, wherein a ratio of a width of the second region along the second direction to a width of the light-emitting surface along the second direction is in a range of 90% to 99%.

4. The backlight module of claim 1, further comprising:
    a plurality of second light-emitting elements,
    wherein the light guide plate comprises a second light-incident side opposite to the first light-incident side, and the light-emitting surface comprises a third region adjacent to the second light-incident side,
    wherein the second light-incident side connects the light-emitting surface and the bottom surface, the second light-emitting elements are arranged along the first direction at the second light-incident side, and the first microstructure groups and the second microstructure groups are disposed in the third region.

5. The backlight module of claim 1, wherein a top end of each first columnar microstructure has a first curved surface, a top end of each second columnar microstructure has a second curved surface, and a radius of curvature of the first curved surface is the same as a radius of curvature of the second curved surface.

6. The backlight module of claim 1, wherein a sum of the first width and the second width is in a range of 0.03 mm to 0.8 mm.

7. The backlight module of claim 1, wherein a difference between the first height and the second height is in a range of 0.008 mm to 0.1 mm.

8. The backlight module of claim 1, wherein a shape of the first columnar microstructures and the second columnar microstructures is triangle with round angle, triangle, bullet, trapezoid, or rectangle.

9. The backlight module of claim 1, further comprising:
an optical film layer disposed on the light-emitting surface, wherein the columnar microstructure groups are separated from the optical film layer.

* * * * *